July 19, 1927.  W. PRELLWITZ  1,636,614
PISTON ASSEMBLY
Filed Aug. 4, 1926
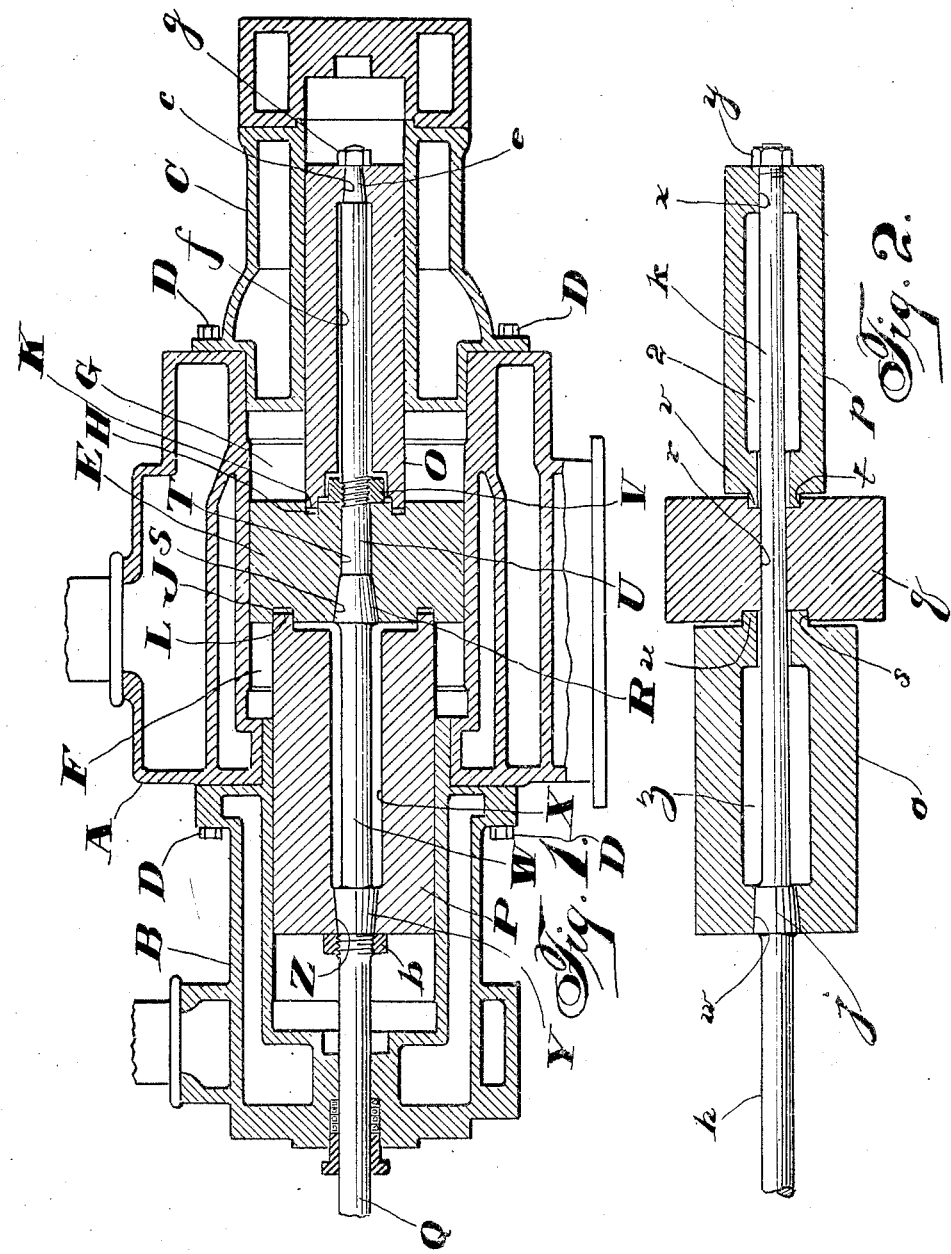
INVENTOR.
*William Prellwitz.*
BY *Herbert G. Ogden*
HIS ATTORNEY.

Patented July 19, 1927.

1,636,614

UNITED STATES PATENT OFFICE.

WILLIAM PRELLWITZ, OF EASTON, PENNSYLVANIA, ASSIGNOR TO INGERSOLL-RAND COMPANY, OF JERSEY CITY, NEW JERSEY, A CORPORATION OF NEW JERSEY.

PISTON ASSEMBLY.

Application filed August 4, 1926. Serial No. 127,055.

This invention relates to pistons, but more particularly to a differential type of piston in which the portions of different diameters are formed separately and are held in assembled relationship with respect to each other by suitable clamping means.

The present invention is particularly applicable to compressors of the multi-stage type in which the several cylinders lie in the same longitudinal plane.

One object of the invention is to render the piston assembly flexible so that the several portions or members comprising the piston may adjust themselves in their respective cylinders when the diameters of the members change due to variations in temperature and other causes of disalignment.

Another object is to prevent relative longitudinal movement between the various members which comprise the piston.

Other objects will appear hereinafter.

The invention consists of the combinations of elements, features of construction and arrangement of parts substantially as hereinafter described and more particularly pointed out in the appended claims and illustrated in the accompanying drawings, in which Figure 1 is a sectional elevation of a plurality of cylinder chambers in which is arranged a piston constructed in accordance with the practice of the invention, and Figure 2 is a longitudinal elevation in section of a modified form of piston.

Referring to the drawings, A represents an intermediate cylinder to the ends of which are secured cylinders B and C. The cylinders B and C may be secured to the cylinder A in any suitable manner, in this instance tap bolts D being used for this purpose. These cylinders are of the type commonly used in multi-stage compressors, the usual inlet and exhaust valves being omitted from the drawings for the sake of simplicity of illustration.

In machines of this type, relative disalignment between the several cylinders is at times caused by unequal expansion and contraction of these elements due to variations in temperature. It therefore frequently happens that one or the other of the cylinders, together with the piston reciprocating therein, is subjected to higher temperatures, due to the heat of compression and other causes than the adjacent cylinders. As a result, the cylinder thus subjected will be drawn out of alignment with the adjacent cylinders, thus causing the piston reciprocating therein to bind on the walls thereof. In order to overcome this objectionable feature in the present instance, a piston member E dividing the cylinder A into a low pressure chamber F and a second stage chamber G is provided with annular grooves H and J in its ends to receive slidably annular projections K and L of piston members O and P reciprocating in the cylinders B and C respectively. It is of course to be understood that there is ample clearance between the annular projections and the walls of the grooves H and J to prevent binding at these points whenever conditions are such that the piston members O and P are caused to incline from the longitudinal axis of the piston assembly. A rod Q which may be the piston rod of the compressor extends through the members E, O and P for connecting them together.

In order to permit relative axial disalignment of the piston members with respect to each other so that the said members may adjust themselves in their respective cylinders, the rod Q is provided with an intermediate tapered portion R to cooperate with a tapered bore S formed in the member E. The tapered bore S extends only partly through the member E and from the small end of said bore to the opposite end of the member is formed a straight bore T to receive a straight portion U of the rod Q. In the present instance the outer end of the straight portion U is threaded to receive a nut V which bears against the end of the member E for holding said member firmly in assembled position on the rod Q. A portion W of the rod Q adjacent the tapered portion R is preferably of smaller diameter than the large end of the tapered bore R to render said portion W flexible and thus also to prevent contact with the walls of a straight bore X in the member P through which the portion W extends.

At the outer end of the portion W of the rod Q is formed a tapered portion Y which cooperates with a tapered bore Z formed in the outer end of the member P for limiting endwise movement of the member P in the direction of the member E. A nut $b$ is in this instance screwed on the rod Q to bear against the outer end of the member P for forcing said member firmly on the tapered portion Y.

The member O is also provided with a tapered bore $c$ which cooperates with the tapered portion $e$ at the end of the rod Q for limiting endwise movement of the member O in the direction of the intermediate member E. A straight bore $f$ leading from the tapered bore $c$ to the inner end of the member O is preferably of somewhat larger diameter than that portion of the rod which extends therethrough to prevent contact between the rod and the wall of the bore $f$. The outer end of the rod Q is threaded to receive a nut $q$ whereby the member O may be forced firmly on the tapered portion $e$. By thus permitting only the outer end of the members O and P to contact with the rod Q, the rod may bend freely whenever one or the other, or both, of the said outer members tend to incline from the longitudinal axis of the intermediate member.

In the modification illustrated in Figure 2, a rod $h$ having a tapered portion $j$ and a reduced cylindrical portion $k$ extends through outer piston members $o$ and $p$ and an intermediate member $q$. In this instance the member $q$ is provided with a straight bore $r$ which cooperates closely with the reduced cylindrical extension $k$ and has cylindrical recesses $s$ and $t$ in its end faces to receive cylindrical projections $u$ and $v$ formed on the inner face of the members $o$ and $p$ respectively. The projections $u$ and $v$ are preferably of a slightly greater length than the depth of the recesses $s$ and $t$ so that only the ends of said projections will abut the member $q$.

Preferably, only the outer ends of the outer members $o$ and $p$ are permitted to contact with the rod $h$, and to this end a tapered bore $w$ is formed in the wall of the member $o$ to cooperate with the tapered portion $j$. A straight bore $x$ is formed in the outer end of the member $p$ to cooperate slidably with the extension $k$. The outer end of the extension $k$ may be screw threaded to receive a suitable nut $y$ for holding the members firmly in assembled position on the rod $h$. The members $o$ and $p$ are also provided with recesses $z$ and 2 to prevent contact between the said members and the rod throughout the greater portion of the length of said members, thus permitting the rod $h$ to bend readily whenever conditions in the cylinders and the piston are such that binding would occur if the piston were made of a single piece.

I claim:

1. An adjustable piston, comprising an intermediate member having a central tapered bore, outer members interlocked coaxially with the intermediate member and having tapered bores in one end, a rod extending through the members, said rod being flexible to permit the outer members to incline from the longitudinal axis of the intermediate member, tapered portions on the rod to cooperate with the tapered bores for limiting endwise movement of the members in one direction with respect to each other, and nuts on the rod for preventing relative longitudinal movement between the members in the opposite direction.

2. An adjustable piston, comprising an intermediate cylindrical member having annular grooves in its ends, a central bore in said member, outer cylindrical members of smaller diameter at the ends of the intermediate member, annular projections on the outer members extending into the grooves for holding the members normally in coaxial relationship with respect to each other, a rod through the members contacting with the outer ends of the outer members and with the wall of the bore in the intermediate member, said rod being flexible to permit the outer members to incline from the longitudinal axis of the intermediate member, and means for preventing endwise movement of the members with respect to each other and with respect to the rod.

3. An adjustable piston, comprising an intermediate member having a tapered bore, outer members interlocked with the intermediate member to hold the members normally in coaxial relationship with respect to each other, said outer members having end tapered bores and straight bores of larger diameter than the tapered bore, a rod of smaller diameter than the straight bores extending through the members, said rod being flexible to permit relative axial disalignment of the members, an intermediate tapered portion on the rod to cooperate with the tapered bore in the intermediate member for limiting endwise movement of the intermediate member in one direction with respect to the rod, outer oppositely extending tapered portions on the rod to cooperate with the tapered bores in the outer members for limiting endwise movement of the outer members in the direction of the intermediate member and nuts screwed on the rod to bear against the members for holding the members on the rod.

In testimony whereof I have signed this specification.

WILLIAM PRELLWITZ.